O. SCHMIDT.
HEAT TRANSMITTING FLUIDS FOR BAKING OVENS AND THE LIKE.
APPLICATION FILED MAY 12, 1914.

1,120,246.

Patented Dec. 8, 1914.

WITNESSES
May G. Luttrell
Edith Terrace

O. Schmidt
INVENTOR
BY G. Croydon Marks
ATTORNEY

UNITED STATES PATENT OFFICE.

OTTO SCHMIDT, OF STUTTGART, GERMANY.

HEAT-TRANSMITTING FLUIDS FOR BAKING-OVENS AND THE LIKE.

1,120,246. Specification of Letters Patent. Patented Dec. 8, 1914.

Application filed May 12, 1914. Serial No. 838,168.

*To all whom it may concern:*

Be it known that I, OTTO SCHMIDT, a subject of the Emperor of Germany, and residing at Stuttgart, Germany, have invented certain new and useful Improvements in Heat-Transmitting Fluids for Baking-Ovens and the like, of which the following is a specification.

For heating baking ovens, drying ovens and other chambers in which an average temperature of, for instance 250–300° is to be regularly maintained by means of any source of heat (fire) of high temperature, or which gives off a varying amount of heat, the system preferably employed is that known as the Perkins system. With this system, tubes closed on all sides and filled to a certain extent with water are provided in the chamber to be heated and each project with one end into the fire or heating space which is separate from the chamber to be heated. In said heating space the tubes are heated and the water inclosed in same transmits the heat quickly and equally into the chamber to be heated.

Figure 1:
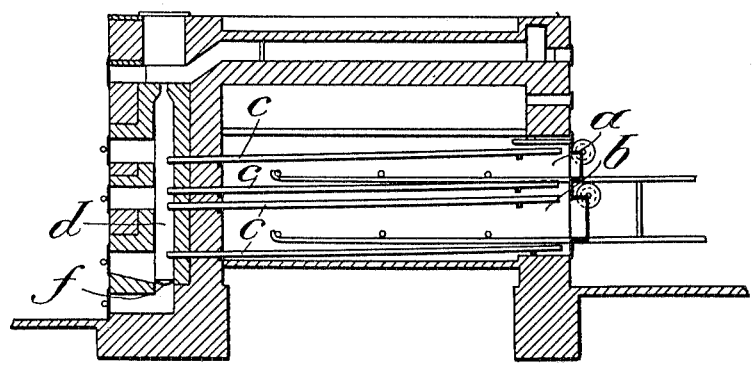

In Figure 1 is illustrated a double baking oven provided with this system of heating, in which $a$ and $b$ are two withdrawable baking hearths of known construction. The thick-walled tubes $c$, $c$ which are filled with water pass through the whole length of the baking space in a somewhat inclined position and penetrate through the brick-work of the baking oven and that of the heating oven $d$ into the heating space. Said heating oven $d$ is provided with grate $f$.

It has now been shown that in spite of the employment of the best material and of thick walls for the tubes $c$, explosions can occur owing to the fact that the water inclosed in the tubes $c$ is heated during normal working up to about 40 or 50° below its critical temperature, so that on increasing the fire the critical temperature is easily attained.

In view of this the heating tubes $c$ have been so arranged that they project only very slightly (about 16 cm.) through the brick-work into the heating space $d$. By this means the danger was somewhat reduced, but not removed and a large proportion of the heat was lost because only a small part of the heating gases passing through the heating space could be employed for heating the tubes.

According to the present invention, the danger of explosion and also the inefficient employment of the heat is removed without requiring inconvenient guarding and safety-devices, by anilin being employed in the closed tubes $c$ to convey the heat. Anilin, while possessing the necessary specific heat, has a critical temperature which lies from 100–150° above the temperature to which the heat-transmitting substance is subjected in working.

Figure 2:
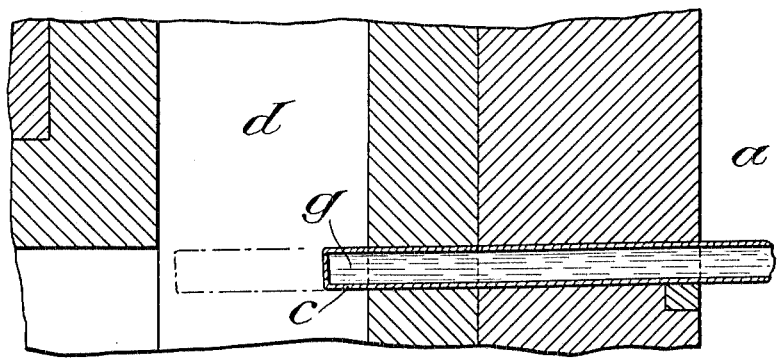

A temporary over-heating need therefore no longer be feared and the tubes $c$ containing the anilin $g$ may extend right through the heating space $d$, as shown in dotted lines in Fig. 2, so that the heating gases are caused to flow past a greater length of tube, and the heat from said gases is more efficiently employed.

Anilin possesses the advantage over other substances of similar high critical temperature, that it does not become decomposed or dissociated with time as is the case with heavy hydrocarbons and that, when it is cold, (within the temperatures occurring in practice) it does not coagulate, nor does it attack the walls of the steel or other tubes.

Having now described my invention what I claim as new and desire to secure by Letters Patent is:—

In heating devices such as baking ovens and the like, walls inclosing a space, anilin in said space, and a source of heat, part of said walls being located to receive heat from said source, and part located to give out such heat.

In testimony whereof I have signed my name to this specification in the presence of two subscribing witnesses.

OTTO SCHMIDT.

Witnesses:
ANTON ARITZ,
FRIDA H. CARTER.